United States Patent
Kamiya

(10) Patent No.: US 7,119,506 B1
(45) Date of Patent: Oct. 10, 2006

(54) DRIVE CONTROLLING DEVICE OF A MOTOR-DRIVEN VEHICLE

(75) Inventor: Satoshi Kamiya, Mori-machi (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 11/160,656

(22) Filed: Jul. 4, 2005

(30) Foreign Application Priority Data

Jul. 6, 2004 (JP) .............................. 2004-198747

(51) Int. Cl.
*H02P 1/00* (2006.01)
*F02D 7/00* (2006.01)

(52) U.S. Cl. ............... 318/139; 318/560; 318/587; 701/93; 701/97; 123/399; 477/107; 477/108

(58) Field of Classification Search ............... 318/139, 318/560, 587, 439, 245, 254; 701/93, 97; 123/399; 477/107, 108
See application file for complete search history.

(56) References Cited

U.S. PATENT DOCUMENTS

| | | | | |
|---|---|---|---|---|
| 4,803,637 A * | 2/1989 | Tada et al. ................ | 701/93 |
| 4,885,692 A * | 12/1989 | Kurihara et al. ........... | 701/97 |
| 5,447,133 A * | 9/1995 | Kamio et al. .............. | 123/396 |
| 5,508,924 A * | 4/1996 | Yamashita ................. | 701/22 |
| 5,552,985 A * | 9/1996 | Hori .......................... | 701/93 |
| 5,594,645 A * | 1/1997 | Nishimura et al. ......... | 701/96 |
| 5,609,546 A * | 3/1997 | Torii et al. ................. | 477/108 |
| 5,676,217 A * | 10/1997 | Torii et al. ................. | 180/179 |
| 5,832,395 A * | 11/1998 | Takeda et al. .............. | 701/22 |
| 6,808,471 B1 * | 10/2004 | Bauerle et al. ............. | 477/107 |
| 6,837,217 B1 * | 1/2005 | Hoshino et al. ............ | 123/399 |
| 6,874,471 B1 * | 4/2005 | Hoshino et al. ............ | 123/399 |
| 2005/0092295 A1* | 5/2005 | Hoshino et al. ............ | 123/399 |
| 2005/0150701 A1* | 7/2005 | Michi et al. ................ | 180/170 |
| 2005/0240334 A1* | 10/2005 | Matsumoto et al. ........ | 701/93 |

FOREIGN PATENT DOCUMENTS

JP        10-309005        11/1998

\* cited by examiner

*Primary Examiner*—Paul Ip
(74) *Attorney, Agent, or Firm*—Ernest A Beutler

(57) ABSTRACT

A motor control for an electric motor powered vehicle having an accelerator control connected to a control circuit for supplying the desired driving power that senses possible errors of various types and stops the supply of driving power until normal operation resumes.

4 Claims, 6 Drawing Sheets

DRIVE CONTROLLING DEVICE OF A MOTOR-DRIVEN VEHICLE

BACKGROUND OF THE INVENTION

This invention relates to a drive controlling device of an electric motor-driven vehicle such as an electric motor-driven golf car or the like ands more particularly to an arrangement for protecting against inadvertent application of power due to a failure in the accelerator control system.

In recent years, there have been proposed a wide variety of electric motor powered vehicles for a variety of purposes. For example, electrically powered golf cars are widely used in golf courses. In such applications controls have been incorporated for accommodating the various terrains over which these vehicles are operated. As a specific example golf carts frequently employ sensors for determining the slope of the ground on which the cart is operating to provide the appropriate power to compensate for changes in grade. An example of such a control arrangement is shown in Japanese Published application JP-A-Hei 10-309005.

In this arrangement, the electric motor-driven golf car, like an ordinary road vehicle, is provided with an accelerator pedal and a brake pedal for operation by the driver to control running of the golf car. Specifically, operation of the accelerator pedal by a driver, for example, is transmitted to an accelerator switch and an accelerator sensor connected to a controller that appropriately controls the drive of a shunt-wound type motor of the vehicle.

However, the electric motor-driven golf car of this type is often subjected to irregular shocks from outside due to particularity of its use. These shocks may be caused from various unique conditions such as the loading and unloading of golf bags or operation over rough ground surfaces. It is not uncommon for these shocks to cause breakage of wire of the accelerator sensor resulting in an abnormality of its output. In such a case, the motor controller fails to read the actual position of the accelerator pedal operated by the driver and the golf car may run against the driver's intention.

It is, therefore, a principal object of this invention to provide in arrangement for insuring against undesired operation in the event of a failure in the accelerator control mechanism.

SUMMARY OF THE INVENTION

A first feature of this invention is adapted to be embodied in a drive controlling device of an electric motor driven vehicle having an electric motor driving a propulsion device of the vehicle in response to the operation of an accelerator pedal by a driver. The controlling device includes a an accelerator control operated by the vehicle operator and an accelerator sensor for outputting a signal corresponding to the operating position of the accelerator pedal. The signal outputted from the accelerator sensor is transmitted to a control for calculating a motor driving current in response to the signal. In the event of an abrupt change in the output signal from the accelerator sensor, the output value of the acceleration sensor is replaced by a given value at which the motor is stopped. After a first given period of time has elapsed the output value of the accelerator sensor is read again for a second given period of time. If at that time the predetermined stoppage canceling condition is satisfied driving current supply from the control means to the electric motor is resumed.

Another feature of this invention is adapted to be embodied in a method of controlling the electric motor of an electric motor driven vehicle having an electric motor driving a propulsion device driven by the electric motor in response to the operation of an accelerator pedal by a driver. The method comprises the sensing of the position of the accelerator pedal and calculating a motor driving current in response to the signal. In the event of an abrupt change in the output signal from the accelerator sensor, the output value of the acceleration sensor is replaced by a given value at which the motor is stopped. After a first given period of time has elapsed the output value of the accelerator sensor is read again for a second given period of time. If at that time the predetermined stoppage canceling condition is satisfied driving current supply from the control means to the electric motor is resumed.

DETAILED DESCRIPTION

Figure 1:
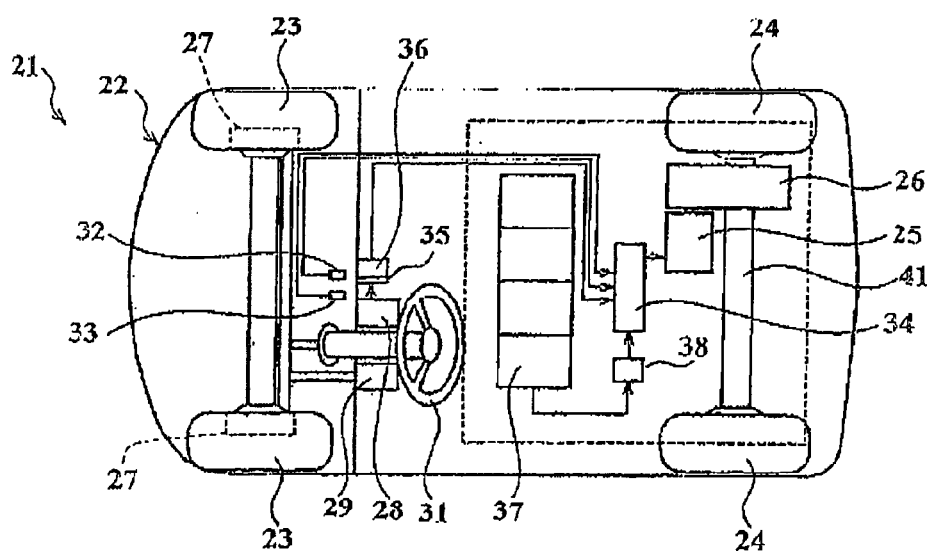
FIG. 1 is a top plan view of an electric powered vehicle in the example of a golf cart constructed and operated in accordance with the invention.

Referring now in detail to the drawings and initially to FIG. 1, an electrically powered vehicle such as a golf cart, as an example of vehicle with which the invention may be practiced is identified generally by the reference numeral 21. This golf cart 21 is provided with a body, frame 22 that rotatably supports in any desired manner paired front wheels 23 and rear wheels 24. In the illustrated embodiment, the rear wheels 24 are driven by a shunt type electric motor 25 through a transmission 26. Associated with some or all of the wheels 23 and 24 (only the front wheels 23 in the illustrated embodiment) are brakes 27 of any desired type.

An operator may be seated on a suitable seat (neither of which are shown) behind an accelerator pedal 28, for controlling the speed of the electric motor 25, a brake pedal 29, for operating the wheel brakes 27, and a steering wheel 31, for steering the front wheels 23 in any desired manner.

Also juxtaposed to the operator's position is a main switch 32, and a direction control switch 33, for controlling the direction of travel of the golf cart 21 by controlling the direction of rotation of the motor 25. The main switch 32 and the direction control switch 33 are connected to a controller 34. Operation of the accelerator pedal 28 is transmitted to an on off pedal switch 35 and an accelerator opening degree sensor 36 connected to the controller 34, to send on or off state of the accelerator 28 and its degree of opening to the controller 34.

A plurality of batteries 37 (48 V in total, for example) as power sources are mounted suitably on the body frame 22 and are connected through a relay 38 to the controller 34.

The construction of a drive controlling device of a golf car according to this invention will now be described by reference to FIG. 2.

The drive controlling device of the golf car 21 is indicated generally by the reference numeral 42 cooperates with the accelerator sensor 36, and includes the controller 34 in which an abnormality of the accelerator sensor 36 is detected based on the condition of the output from the accelerator sensor 36 in accordance with the procedures as will be described later.

As has already been noted, the accelerator sensor 36 is connected to the accelerator pedal 28 and outputs to the controller 34 a voltage corresponding to the amount of depression of the accelerator pedal 28 by the driver.

The controller 34 is provided with a processing unit (MPU) 43 that receives a voltage from the accelerator sensor 36 for performing a given calculation for the drive of the motor; a memory (EEPROM) 44 for storing data; a motor driving circuit 45 for outputting a current for the drive of the motor 25; and a power source circuit 46 for supplying electric power from batteries 37 to the MPU 43, motor driving circuit 45 and accelerator sensor 36. In this embodiment, the power source circuit 46 is arranged such that it supplies electric power of 48V to the motor driving circuit 45 in response to main switch 32 being switched on, electric power of 5V to the processing unit 43, and likewise, electric power of 5V to the accelerator sensor 36, as an example. The accelerator sensor 36 and the power source circuit 46 are connected by a power source line 47 and a ground (GND) line 48. The accelerator sensor 36 is connected to the processing unit 43 through a signal line 49 for outputting a voltage corresponding to the position of the accelerator pedal 28.

The controlling device 42 is provided with a warning device such as a buzzer 28 for warning the driver of occurrence of an abnormality at the time of determination of an abnormality in the manner to be described later. The warning buzzer 51 is connected to the processing unit 43 for judging the abnormality of the accelerator sensor 36.

Figure 3:
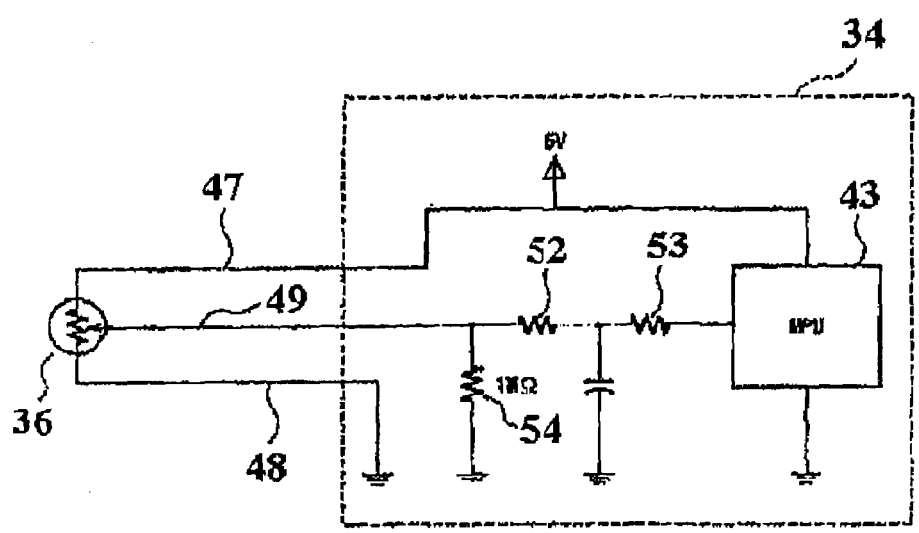
FIG. 3 is a schematic wiring drawing of wiring around the input section of the accelerator sensor and the controller of the controlling device.

Referring now to FIG. 3, the processing unit 43, shown by a broken line, internally performs a judgment of abnormality of the accelerator sensor 36, averages read values of the accelerator sensor (accelerator sensor averaging process), and further calculates a driving current and a duty ratio of the motor by using the accelerator average value obtained, for the PWM output to the motor driving circuit 45. The motor driving circuit 45 has internally the function (current detection circuit) of detecting the motor driving electric current being outputted at present, and the value of the detected motor current is fed back to the processing unit 43.

As shown in FIG. 3, the signal line 49 from the accelerator sensor 36 is connected to the input section of the processing unit 43 of the controller 34 through resistors 52, 53. The signal line 49 is dropped to the ground (GND) through a resistor 31 having a resistor value (for example, 1 MΩ) much larger than that of the resistor 52 or 53, and located closer to the accelerator sensor 36 than the resistors 52, 53.

In the operation of the controlling device 42 according to this invention, if a breaking of wire occurs in any of the power source line 47, the ground (GND) line 48 or the signal line 49 connected to the accelerator sensor 36, or an abnormality happens in the signal output from the accelerator sensor due to chattering, such an abnormality is detected immediately, and running of the golf car 21 itself is stopped and warning of the abnormality is issued to the driver with the warning buzzer 51. This will now be described by reference to the control routine shown in FIG. 4 and the various types of failures that may occur, as shown in FIGS. 5–8.

Figure 5:
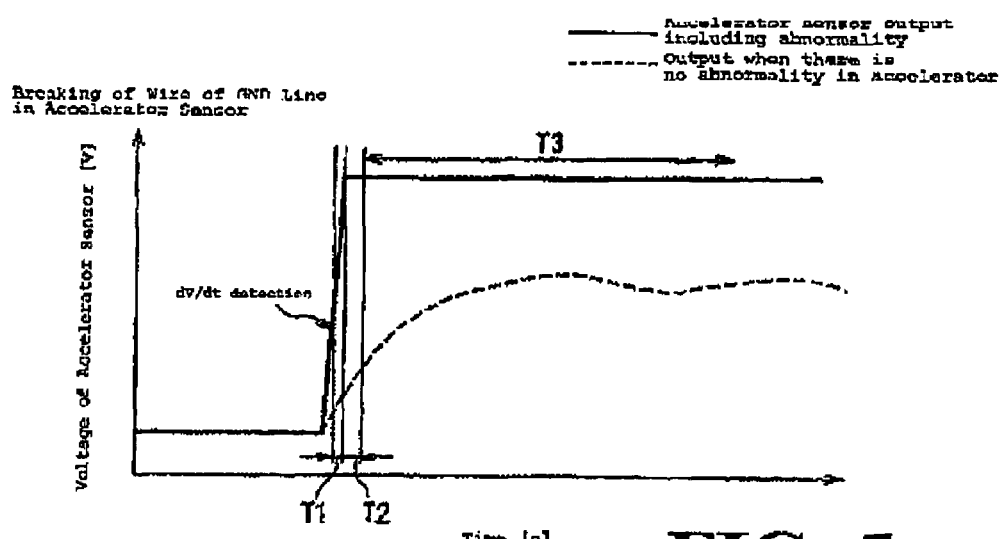
FIG. 5 is graph showing one occurrence of an abnormality in the accelerator sensor such as an example of change in the sensor output when the GND line of the accelerator sensor is broken.

For example, if the GND line 48 connecting the accelerator sensor 36 and the power source circuit 46 is completely broken by some external force as shown in FIG. 5, the signal line 49 is dropped to the ground (GND) through a resistor 54 having a much larger resistor value than the resistor inside the accelerator sensor 36 and the voltage detected by the processing unit 43 in the construction shown in FIG. 3 is fixed to a value around 5V, and as illustrated by the solid line in FIG. 5. The broken line in FIG. 5 shows an example of the change in the output voltage of the accelerator sensor 36 at the time of depression of the accelerator pedal when the accelerator sensor is normal. Thus if the GND line 48 of the accelerator sensor 36 has been broken, an abrupt voltage rise in the output of the accelerator sensor 36 results, as well as a subsequent state of constant voltage (fixed voltage). Detection of this change in voltage allows detection of breaking of a wire in the GND line 48 by the voltage monitoring in the processing unit 43.

Figure 6:
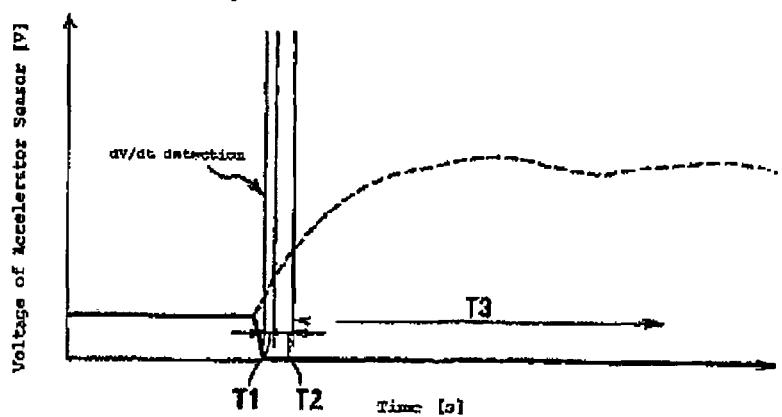
FIG. 6 is a graph showing another occurrence of an abnormality in the accelerator sensor such as an example of change in the sensor output when a power source line or a signal line of the accelerator sensor is broken.

Also if the power source line 47 or the signal line 49 were to be completely broken, the voltage value detected by the processing unit 43 in the construction of FIG. 3 drops to 0V, resulting in the voltage drop as shown in FIG. 6.

Figure 7:
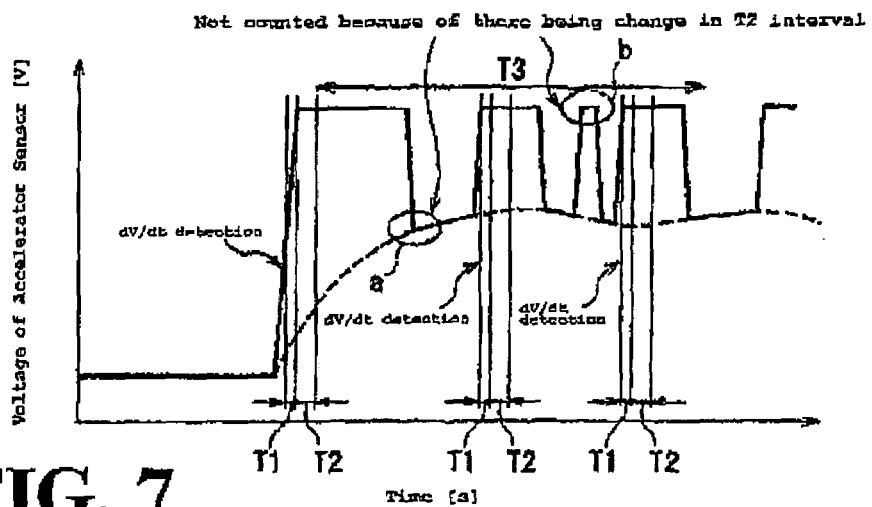
FIG. 7 is still another graph showing an occurrence of an abnormality in the accelerator sensor such as a change in the sensor output when chattering occurs between the power source line and the signal line of the accelerator sensor.
Figure 8:
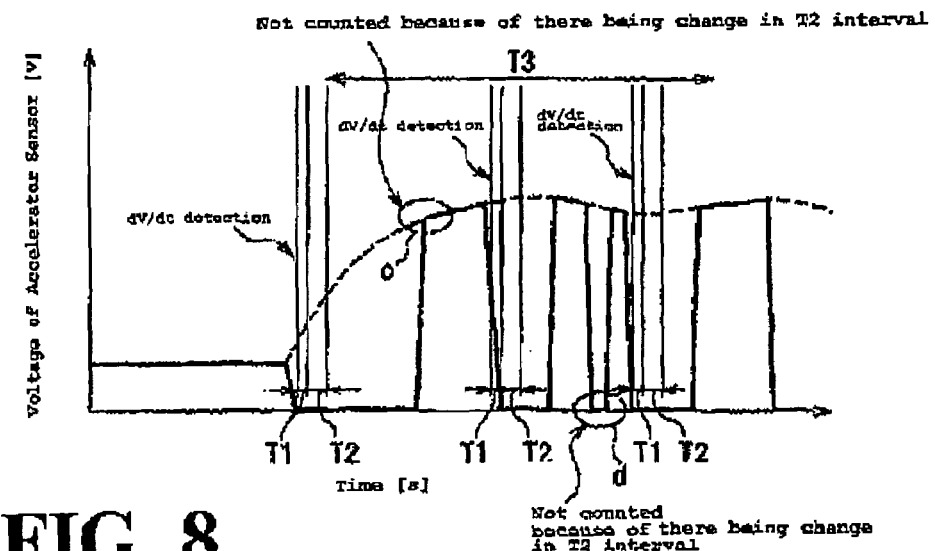
FIG. 8 is a further graph showing an occurrence of an abnormality in the accelerator sensor as occurs when chattering occurs between the signal line and the GND line of the accelerator sensor.

If a so-called chattering occurs in which connection and breaking of wire are repeated within a very short time between the signal line 49 and the power source line 47 of the accelerator sensor 36, the voltage value of the accelerator sensor is an alternate output of 5V and an output value corresponding to the current accelerator position, showing output behavior represented by FIG. 7. Further, if there is chattering between the signal line 49 and the GND line 48 of the accelerator sensor 36, the voltage value of the accelerator sensor is an alternate output of 0V and an output value corresponding to the current accelerator position, showing output behavior represented by FIG. 8. FIG. 7 and FIG. 8 are drawings when it is assumed that chattering continues for a relatively long time.

In the event of the abnormality of the accelerator sensor 36 in any of these manners, the controlling device 42 according to this invention performs a control of immediately stopping the drive of the motor 25 to stop running of the golf car 21 and performs a control of preventing stoppage of running of the golf car 21 when a normal output of the accelerator sensor 36 can be regained.

Figure 4:
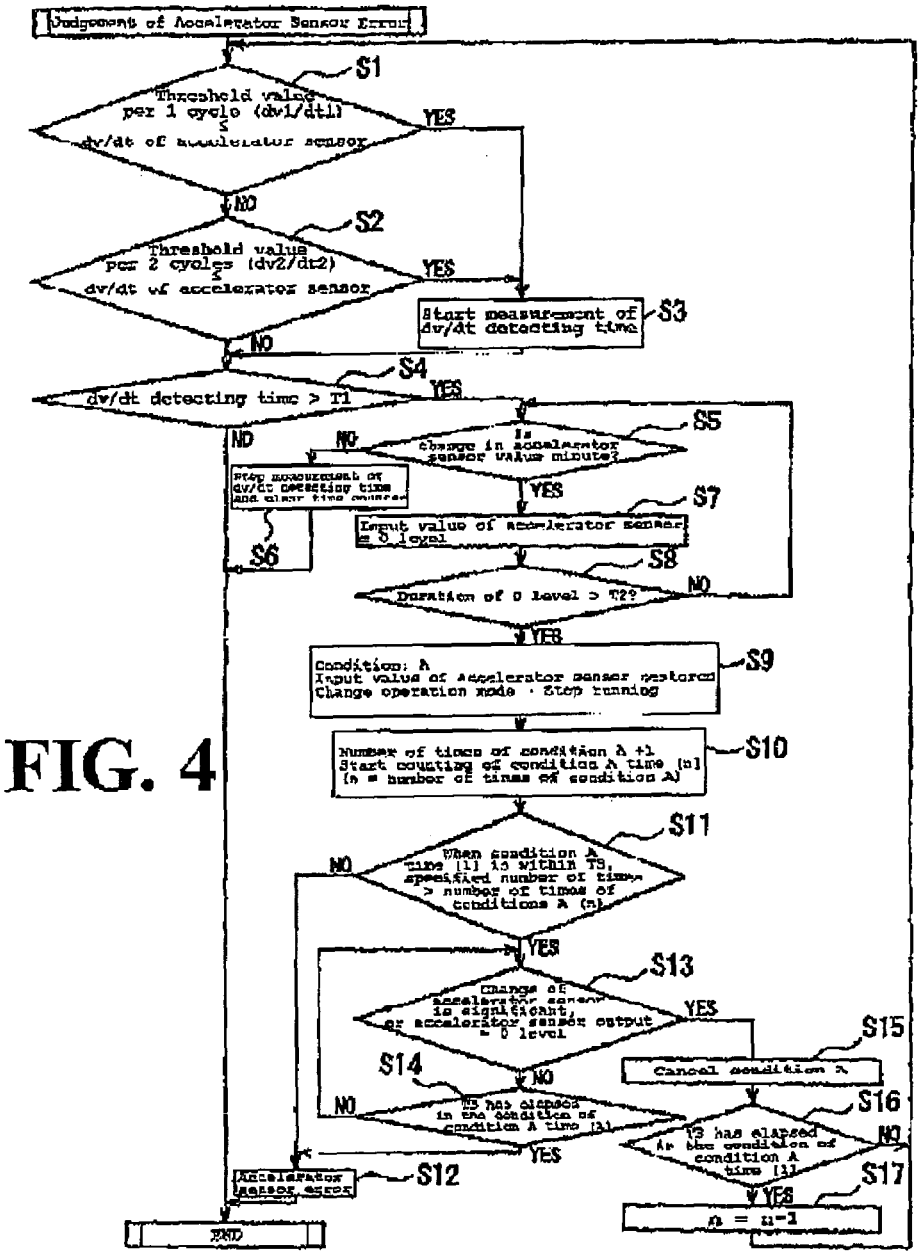
FIG. 4 is a flowchart showing operations of the controlling device.

How this is accomplished will now be described by reference to the control routine shown in FIG. 4 and stored in a given memory in the controlling device 42 and executed by the processing unit 43 at set intervals for example, every 5 msec. The program starts at the step S1 where the change in the output voltage of the accelerator sensor 36 per unit time dv/dt is calculated to judge whether or not the calculated value is larger than a predetermined threshold value per one cycle.

If larger than the predetermined value (Yes), a judgment is made that there is the possibility of occurrence of an abnormality in the accelerator sensor 36 and the routine proceeds to the step S3. If not larger than the predetermined value (No), a judgment is made that the accelerator sensor 36 is normal and the routine proceeds to the step S2.

Assuming that the value is No the program moves to the step S2. This is done because there is the possibility that because of judging time of one cycle is too short depending on the detection timing and voltage change being small, although an abnormality has occurred actually in the accelerator sensor 36. This prevents a misjudgment that the procedure is judged to be Yes at the step S1, there might be a misjudgment that "the system is normal."

This is prevented at the step S2, where the amount of voltage change (absolute value of dv/dt) of the output of the accelerator sensor per two routine cycles is calculated in a prolonged judging time. Thus it is judged at this step whether or not the calculated value is larger than a predetermined threshold value (dv2/dt2) per two cycles.

If larger than the threshold value (Yes), a judgment is made that there is the possibility of occurrence of an abnormality in the accelerator sensor 36 and the routine proceeds to the step S3. If not larger than the threshold value (No), a judgment is made that the accelerator sensor 36 is normal and the routine proceeds to the step S4.

Even if a judgment is made at the steps S1 and S2 that there is the possibility of occurrence of an abnormality in the accelerator sensor 36, the accelerator sensor 36 may return to a normal output condition again in case of a momentary output rise, for example, due to noise or the like. Therefore, at the step S3 a timer is started to see the output change over time from the initial rise.

The present time on the timer which has been started at the step S3 is read at the step S4 to judge whether or not a minute time T1 has elapsed corresponding to the length of time required for the noise to terminate after the beginning of its development. If it is judged that time T1 has elapsed (Yes), the routine proceeds to the step S5. On the other hand, if it is judged that the time has not elapsed yet (No), this routine is terminated to wait till the time T1 has elapsed and the next routine is started.

If the abnormal change in the output of the accelerator sensor 36 determined at the steps S1 and S2 is due to noise, for example, the output of the accelerator sensor 36 is normalized at the time the minute time T1 has elapsed at the Step S5 and in the mean time, the output of the acceleration sensor must be changed significantly in association with its restoration. Therefore, at this step, the amount of change in the acceleration sensor value is read to judge whether or not the change is minute.

If not minute (No), that is, if it is judged that the output has returned to a normal condition because the sensor output is changed significantly by the time that a time T1 has elapsed after the judgment of there being the possibility of occurrence of an abnormality of the accelerator sensor, the routine proceeds to the step S6.

On the other hand, if the amount of change in the output of the accelerator sensor is minute (Yes) at the step S5, it is judged that the abnormality of the accelerator sensor is determined and the routine proceeds to the step S7.

At the step S6, on the premise that the foregoing output change is due to noise, time measurement started at the step S3 is stopped to clear the timer counter and terminate this routine.

Figure 2:
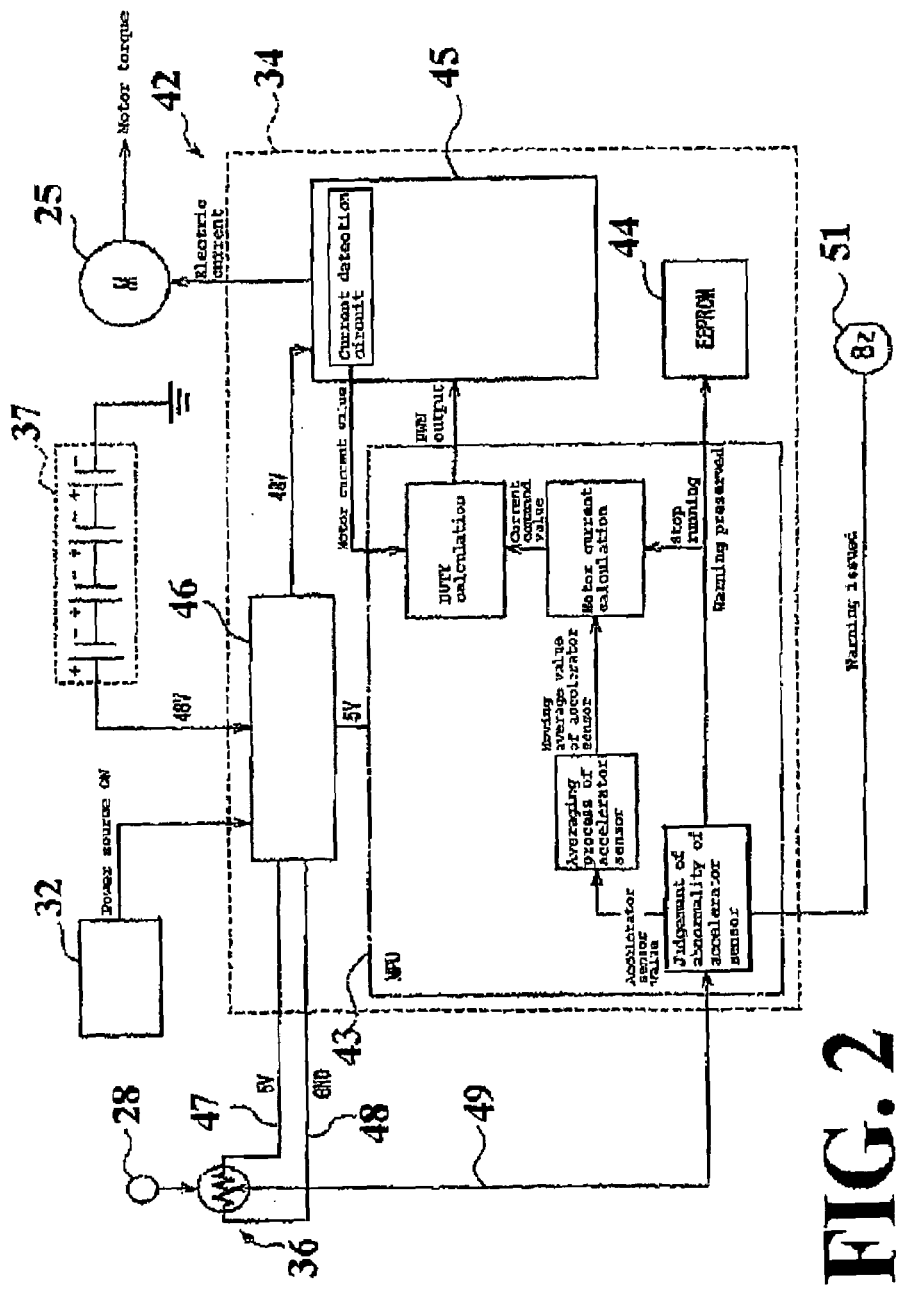
FIG. 2 is a block diagram of a drive controlling device for a golf car in accordance with the invention.

On the other hand, if it is not minute at the step S7 the value of the accelerator sensor in the processing unit 43 of FIG. 2 is replaced by a value of the 0 level for a certain specified time T2, to stop operation of the motor 25, based on the judgment of the abnormality of the accelerator sensor. The "0 level" used here is set at a very small voltage value (for example, 0.5V), at which the motor is not driven, from the viewpoint of discrimination from the condition in which the driver hasn't stepped on the accelerator pedal 28 at all (in this case, the sensor output is 0V).

Then at the step S8 the duration of the accelerator sensor value of 0 level in the procedure executed at the previous step S7 is checked to judge whether or not a certain specified time T2 has elapsed at present. If judged that the time T2 has elapsed (Yes), the routine proceeds to the step S9 and if the time T2 has not elapsed yet (No), the routine returns to the step S5 and the foregoing procedure of 0-level replacement is maintained.

At the step S9 to avoid erroneous abnormality detection by the accelerator sensor 36, the output value from the accelerator sensor 36, which has been on the 0 level till now, is read again and at the same time, the operation of the golf car is set to the stop running mode. This is provisionally called a setting of condition A (or flag A).

At the step S10 a certain period of time T3 is provided and if periods of conditions A occupy a small part within the period of time T3, that is, in the case of light chattering, a procedure is performed to cancel the condition A to restore a condition in which the accelerator pedal can be used (condition in which running is possible). Therefore, at this step S10, counting the time of condition A [n: number of times of condition A] is started, or if the counting was started at the previous routine, the number of times [n] of condition A is increased by 1. In connection with the counting of the condition A, since portions a, b, c in the models of output changes shown in FIG. 7 and FIG. 8 are located at positions within the period T2 after the abnormal change and the accelerator sensor values are changed in response to the actual movement of the accelerator pedal 28, the routine at the previous step S5 is judged to be No, resulting in no counting of the condition A.

Then at the step S11 the number of times [n] of condition A at present is checked to judge whether or not the number of times is smaller than a specified number of times N (for example, three) within a given period T3 as a threshold determined in advance corresponding to the abnormality of the accelerator sensor 36. If the number of times n of condition A at present is larger than the specified number of times N (No), breaking of wire or chattering has occurred in the accelerator sensor 36 and therefore, the routine proceeds to the step S12.

At the step S12 a procedure for taking measures against occurrence of an abnormality of the accelerator sensor is that running of the vehicle is stopped while the warning buzzer 51 is operated to warn the driver that an abnormality has occurred in the output of the accelerator sensor. In this connection, occurrence of an error may also be preserved in an external storage device (not shown) such as a non-volatile memory.

On the other hand, if at the step S11 the number of times n of condition A at present is smaller than the specified number of times N (Yes), there is the possibility that the accelerator sensor 36 has returned to a normal operation again and therefore, the routine proceeds to the step S13.

At the step 13 it is judged whether or not there has been any significant change in the output of the accelerator sensor 36 corresponding to the actual accelerator position from the time the condition A (restoration of the input value of the accelerator sensor) was set at the step S9, or whether or not it is in a condition in which the driver hasn't stepped on the accelerator pedal 28 at all (that is, in the condition of the 0-level output of the accelerator sensor 36).

If there at the step S13 there has been no significant change in the accelerator sensor output or no 0-level output of the accelerator sensor up to the present, this corresponds to the condition in which the sensor output is fixed to 5V or 0V as shown in FIG. 5 and FIG. 6 (not at the 0 level) and therefore, the routine proceeds to the step S14 for a judgment of whether or not the given time T3 has elapsed.

On the other hand, if there has been a significant change in the accelerator output up to the present or if the output of the accelerator sensor 36 is on the 0 level (Yes) at the step S13, the routine proceeds to the step S15.

At the step S14 it is judged whether or not the given time T3 has elapsed in the present condition of condition A. If it has not elapsed (No), the routine returns to the step S13 and the judgment is continued of the change in the accelerator sensor, or the existence of the 0 level.

On the other hand, if the given time T3 has elapsed (Yes) at the step S14, this corresponds to the condition in which there has been no significant change in the accelerator sensor output or no 0 levels in spite of the elapse of this time T3 and therefore, the abnormality of the accelerator sensor is determined an the routine proceeds to the step S12.

If the program has moved to the step S15 from the step S13, a canceling operation (for example, resetting of the flag) of the condition A set at the step S9 is performed corresponding to the condition in which the output of the accelerator sensor 36 has returned to a normal condition. However, even if the condition A is canceled, it is possible that the accelerator sensor output changes again to 5V or 0V before the given time T3 has elapsed as shown in FIGS. 7 and 8. Therefore, this routine proceeds to the step S16.

Then at the step S16 it is judged whether or not the given time T3 has elapsed in the present condition of condition A, as in the case of the step S14. If it has not elapsed (No), the routine returns again to the step S1 for the judgment of the change in the accelerator sensor output.

On the other hand, if the given time T3 has elapsed at the step S16 in the condition in which the condition A is canceled (Yes), the routine proceeds to the step S17 where, since the condition A was canceled at the step S15, the count number n of the condition A measured up to now is decreased and the routine returns to the step S1.

Thus from the foregoing description of procedures executed by the processing unit 43 in the controlling device 42, if there is an abrupt change in the accelerator sensor output (electric current value) to the controller 34, no current is supplied to the motor 25 to replace the value by a value on the 0 level. Thus, even if there is an abrupt output change due to breaking of wire of the accelerator sensor or chattering during stoppage of the golf car 21, for example, the golf car 21 will not start moving. Also, according to this embodiment, since the 0 level of the accelerator sensor 36 is set to be a little higher than 0V, the accelerator sensor output of 0V as a result of breaking of wire of the power source line 47 or the signal line 49 in the accelerator sensor 36 can be discriminated from the case in which the accelerator pedal 4 is not depressed. Further, in the embodiment, since the number of times of 0-level setting of the sensor output within an given time as described above is provided as a requirement for cancellation of the judgment of the accelerator sensor error, an erroneous judgment from the detection failure due to noise can be avoided.

Of course those skilled in the art will readily understand that the described embodiment is only of a exemplary form that the invention may take and that various changes and modifications may be made without departing from the spirit and scope of the invention, as defined by the appended claims.

What is claimed is:

1. A drive controlling device of an electric motor driven vehicle having an electric motor driving a propulsion device of the vehicle in response to the operation of an accelerator pedal by a driver, said controlling device including a an accelerator control operated by the vehicle operator and an accelerator sensor for outputting a signal corresponding to the operating position of said accelerator pedal, a circuit transmitting said signal outputted from said accelerator sensor to a control for calculating a motor driving current in response to said signal, a circuit for replacing the outputted signal with a given value at which the motor is stopped In the event of an abrupt change in the output signal from the accelerator sensor, a timer for reading the output value of the acceleration sensor after a first given period of time has elapsed for a second given period of time and resuming driving current supply from said control means to said electric motor If at said second time period the predetermined stoppage canceling condition is satisfied.

2. The drive controlling device of an electric motor driven vehicle as set forth in claim 1, wherein the output signal from the accelerator sensor is a voltage value, and the given value which is replaced through the motor stopping means is not 0V.

3. The drive controlling device of an electric motor driven vehicle as set forth in claim 1, further including a warning device for giving a warning to the operator upon the replacing the outputted signal with a given value at which the motor is stopped.

4. A method of controlling the electric motor of an electric motor driven vehicle having an electric motor driving a propulsion device driven by the electric motor in response to the operation of an accelerator pedal by a driver comprising the steps of sensing of the position of the accelerator pedal and calculating a motor driving current in response to the signal, determining the event of an abrupt change in the output signal from the accelerator sensor and replacing the output value of the acceleration sensor with a given value at which the motor is stopped reading the output value of the accelerator sensor after a first given period of time has elapsed for a second given period of time, and canceling the predetermined stoppage canceling condition if the second reading of the output value of the accelerator sensor does not indicate an abrupt change.

* * * * *